United States Patent
Navon et al.

(10) Patent No.: US 7,554,889 B2
(45) Date of Patent: Jun. 30, 2009

(54) DATA SAMPLING AND EXTRACTION METHOD AND SYSTEM

(75) Inventors: Shay Navon, Kiriat Ata (IL); Nir Maurer, Naharia (IL); Michael Levin, Holon (IL)

(73) Assignee: Zoran Corporation, Sunnyvale, CA (US)

( * ) Notice: Subject to any disclaimer, the term of this patent is extended or adjusted under 35 U.S.C. 154(b) by 932 days.

(21) Appl. No.: 11/192,305

(22) Filed: Jul. 28, 2005

(65) Prior Publication Data

US 2007/0025211 A1   Feb. 1, 2007

(51) Int. Cl.
G11B 20/10 (2006.01)

(52) U.S. Cl. .............. 369/47.28; 369/47.35; 369/59.23; 369/53.21

(58) Field of Classification Search ........................ None
See application file for complete search history.

(56) References Cited

U.S. PATENT DOCUMENTS

| | | | |
|---|---|---|---|
| 5,581,536 A * | 12/1996 | Klein et al. .............. 369/44.34 |
| 6,034,937 A * | 3/2000 | Kumagai ................. 369/47.26 |
| 6,608,804 B2 | 8/2003 | Shim ....................... 369/53.22 |
| 6,643,080 B1 * | 11/2003 | Goodner et al. .......... 360/73.03 |
| 6,708,299 B1 | 3/2004 | Xie ............................ 714/718 |
| 6,844,549 B2 * | 1/2005 | Matsumoto et al. ............ 850/1 |
| 6,950,379 B2 * | 9/2005 | Yen et al. ................. 369/47.28 |
| 7,006,415 B2 * | 2/2006 | Hou et al. ................ 369/53.34 |
| 7,082,082 B2 * | 7/2006 | Tomita .................... 369/47.27 |
| 2004/0190420 A1 | 9/2004 | Yen et al. ................. 369/59.19 |
| 2004/0213091 A1 | 10/2004 | Shim ....................... 369/13.38 |
| 2005/0047289 A1 | 3/2005 | Wada ....................... 369/44.28 |
| 2006/0092799 A1 * | 5/2006 | Lee et al. ................. 369/53.22 |
| 2006/0181998 A1 * | 8/2006 | Chen et al. ............... 369/47.48 |

* cited by examiner

Primary Examiner—Thang V Tran
(74) Attorney, Agent, or Firm—Lowrie, Lando & Anastasi, LLP

(57) ABSTRACT

A sampling rate for extracting information encoded on an optical disk is determined. First and second instances of a signal representing data encoded on the disk is detected, from which a disk rotation speed is determined. Based on the disk rotation speed, a sampling rate is determined.

33 Claims, 7 Drawing Sheets

DATA SAMPLING AND EXTRACTION METHOD AND SYSTEM

FIELD OF THE INVENTION

The present invention relates to sampling data from media, and in particular to sampling data from burst cutting areas of optical disks to determine the content encoded thereon.

BACKGROUND

The use of optically readable disks for storing data, digitally compressed audio and/or video signals offers the consumer access to data, sound and picture content with a quality virtually indistinguishable from the original material. However, the ability of the general public to replicate copyrighted material has created a need to prevent or control the use and unauthorized copying and dissemination of disk contents. The specifications for producing replicated optical disks and optical disk planks suitable for recording (e.g., digital versatile disks (DVDs) and compact disks (CDs)) use of a code to facilitate the individual identification of disks following mass production. A typical disk includes a code comprising a series of radially positioned cuts or surface reflectance deformations in an area referred to as the "burst cutting area" or BCA. The radial stripes are positioned to over-write and partially obliterate the disk area specified for lead-in data. As illustrated in FIG. 1, the BCA is arranged on the inner periphery of an optical disk 100 and is made up of a series of low-reflectance stripes that represent the BCA code.

The BCA code is formed on the disk 100 using a laser cutting process after the fabrication of the disk. Thus, the manufacturer can record desired information in the BCA 105 in the form of the BCA code 110. For example, the serial number of the disk or anti-counterfeit information can be encoded onto the disk. Similar to the BCA 105 that is encoded on DVD-RAMs, the narrow burst cutting area (NBCA) contains encoded data that performs the same function and is stored in the same format as BCA data on DVD-RWs.

The disk rotation speed of a DVD can vary significantly, and is especially unstable when the disk is inserted into a playback or read device. It is at insertion that the device must read the BCA code and determine if, for example, the disk is a legitimate or pirated copy. Disk jitter during routine playback and/or player vibration (e.g., in a moving vehicle) introduces additional complexities with respect to reading the BCA code data. Current systems that synchronize the sampling rate to a constant disk speed, or that contain controller mechanisms (e.g., a tachometer in the form of a Hall effect rotational speed sensor) to control the disk speed, require additional components and thus are more expensive to produce. Therefore, what is needed is a method and accompanying apparatus to read data from the BCA at a wide range of disk rotation speeds that can be implemented without additional hardware requirements.

DESCRIPTION OF THE INVENTION

Brief Summary of the Invention

Due to the placement of the BCA code and the different encoding format used (as compared to the standard format of content on the disk), the parameters for reading the code differ from those used to read the main content of the disk. In standard operation, an optical head reads data encoded on the disk in a spiral fashion as the disk rotates and the optical head moves radially away the center of the disk. Many of the mechanical and electronic components of a standard DVD player are dedicated to maintaining a constant linear velocity of the disk in conformance with the DVD standard. Previous systems directed towards reading the BCA code have attempted to determine an appropriate sampling rate to search and read the BCA code data based on a known, constant disk rotation speed and a clock speed synchronized to the BCA data rate commensurate with the chosen constant disk rotation speed.

The present invention allows optical disk readers to search and read data encoded onto the burst cutting and narrow burst cutting areas (BCA and NBCA) of an optical disk without the need for precise control of disk rotation and precise synchronization with the data as it is acquired from the disk. The invention is especially well suited for use in digital versatile disks having encryption and/or content management information encoded in the BCA. Whereas previous methods utilize a brushless spindle motor, tachometer, and controller mechanisms to maintain a constant disk rotation speed such that the BCA code can be read, the present invention eliminates the need for such extra components, allowing for software-only modifications to current DVD playback devices. As a result, the cost of manufacturing playback devices can be greatly reduced by eliminating the need for a brushless spindle motor and controller to continually monitor the disk speed, and the time necessary to accurately extract the BCA data is reduced due to the increased extraction quality over systems that do not employ such rotation velocity feedback.

Although it should be understood that the invention has relevance to virtually any apparatus that reads data from disks for any purpose, and can be implemented in any suitable manner, for explanatory purposes the ensuing discussion will focus on the use of the claimed methods and systems with respect to a DVD and an optical reader therefor.

Accordingly, in a first aspect, a method for determining a sampling rate for information on an optical disk comprises detecting a first and second instance of a signal representing data (used, for example, to protect the content from unauthorized use or copying) encoded on an optical disk. Based on the first and second instances of the signal, a disk rotation speed is determined, which facilitates determination of a sampling rate. The optical disk may be a compact disk (CD), a digital versatile disk (DVD), a high-definition DVD (HD-DVD), a Blu-ray disk, or a disk comprising attributes of a high-definition DVD and a Blu-ray disk. The data encoded on the optical disk may be encoded within the BCA of the disk, and/or the NBCA of the disk, and the first and second instances of the signal are read therefrom. The disk rotation speed may be determined by measuring a front-to-front time of an envelope associated with the data during one rotation of the optical disk. The disk may be rotating at a non-uniform speed (e.g., during start up and/or due to jitter), or at a constant angular velocity. The information may be extracted from the disk using, for example, the determined disk sampling rate, and in some cases the information may be searched for a an encryption/decryption key, as an example.

In a second aspect, the invention relates to a system for extracting information from an optical disk. The system comprises a read element for detecting a data pattern from an optical disk and a disk-speed measurement element, is responsive to the read element, for measuring consecutive detections of a data signal therefrom. This facilitates determination of a disk rotation speed and a sampling rate. Either or both of the read element and the disk-speed measurement element may be incorporated within an optical disk drive. The optical disk may be a compact disk (CD), a digital versatile disk (DVD), a high-definition DVD (HD-DVD), a Blu-ray disk, or a disk comprising attributes of a high-definition DVD and a Blu-ray disk. The data pattern on the optical disk may be encoded within the BCA of the disk, and/or the NBCA of the disk, and the consecutive detections of the data signal are read therefrom. The measurement element may determine the disk rotation speed by measuring a front-to-front time of an envelope associated with the data during one rotation of the optical disk. The read element may read the consecutive instances of a data signal while the disk is rotating at a non-uniform speed, or a constant angular velocity. The system may also include a data-extraction element for extracting information from the optical disk using the determined sampling rate, and some embodiments may also include a content-protection element which, upon receiving the extracted information from the data-extraction element, uses the information to manage access to data encoded on the optical disk.

Other aspects and advantages of the invention will become apparent from the following drawings, detailed description, and claims, all of which illustrate the principles of the invention, by way of example only.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Throughout the following descriptions and examples, the illustrative descriptions of the invention is described in the context of reading data from the burst cutting area and the narrow burst cutting areas of DVDs. However, it is to be understood that the present invention may be applied to reading data encoded on any storage carrying media.

Figure 1:
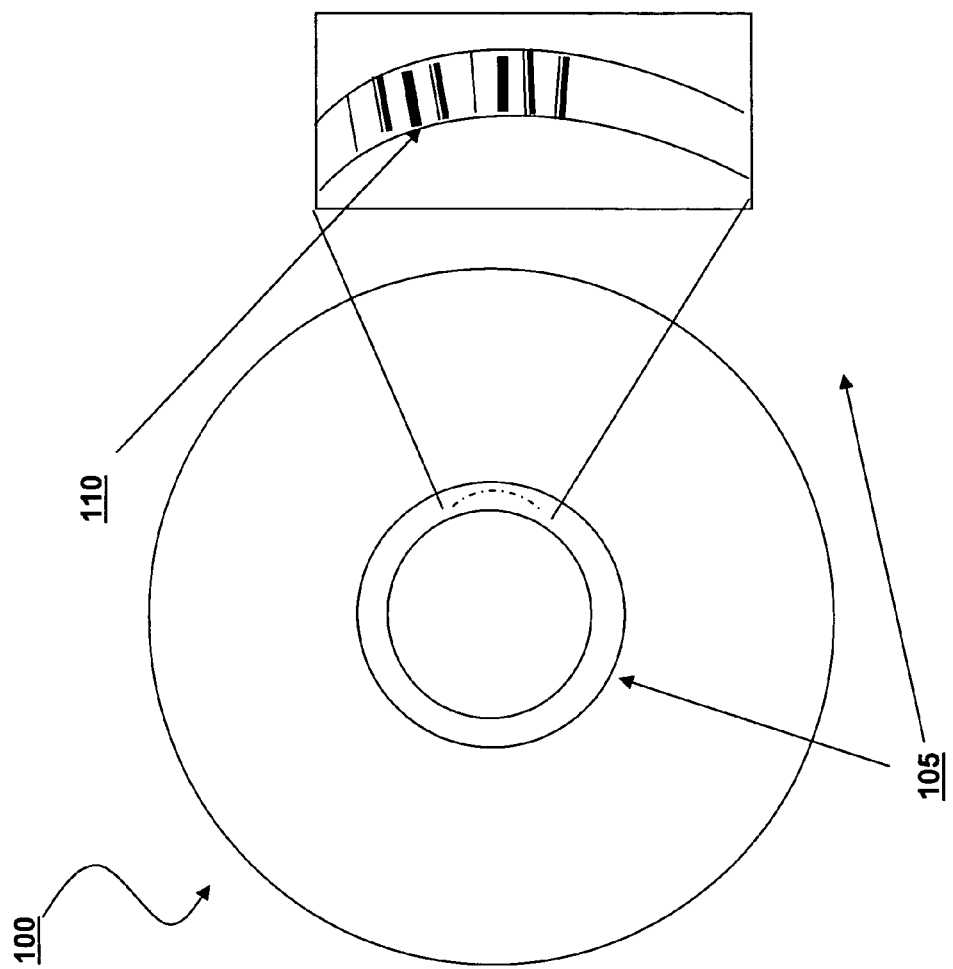
FIG. 1 illustrates a representative optical disk including a data encoded in the burst code area to which the present invention may be applied.
Figure 2:
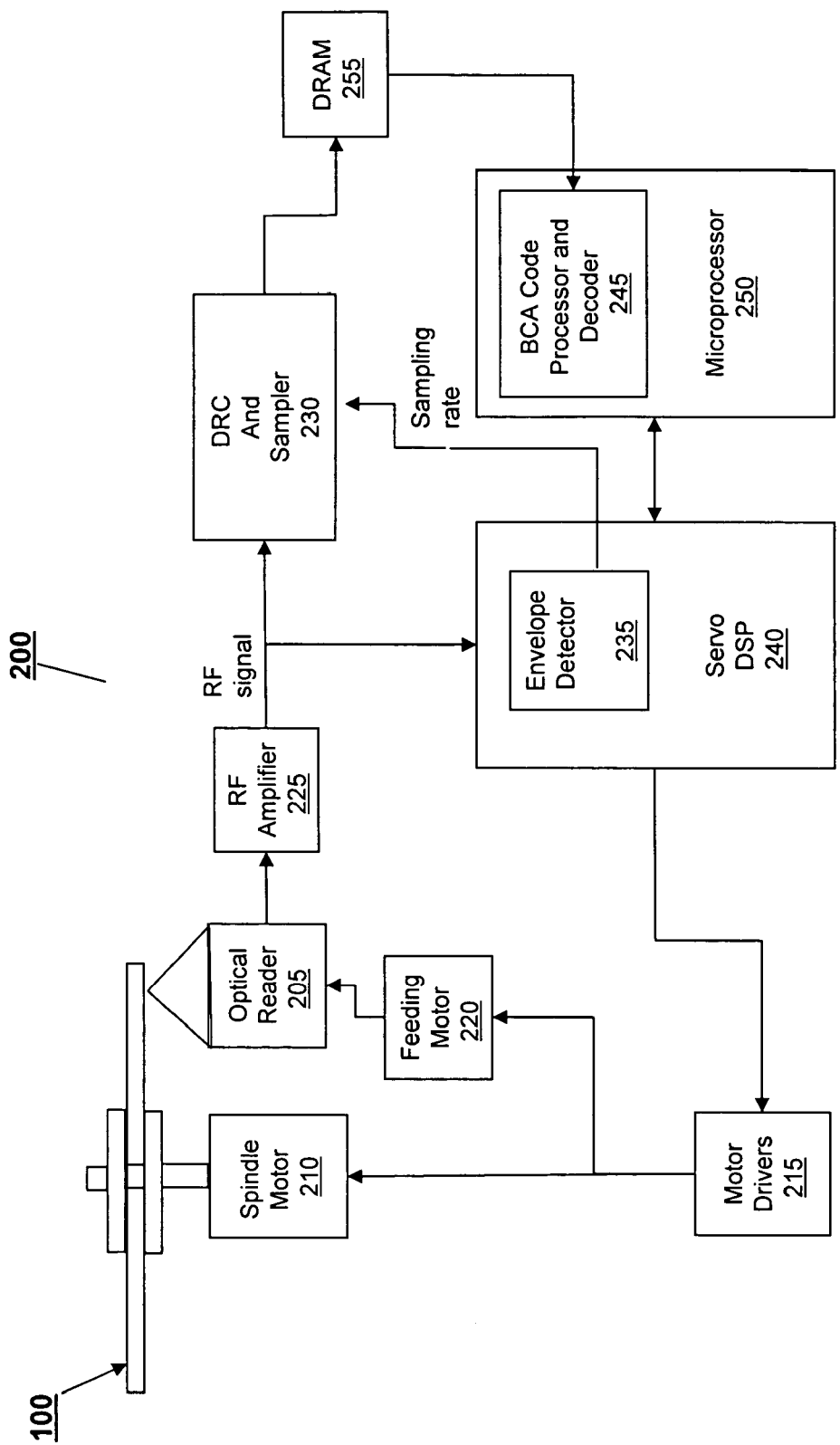
FIG. 2 is a block diagram illustrating an optical disk reading apparatus to which the present invention may be applied.

Referring to FIG. 2, a playback device containing a data source such as an optical disk drive 200 is used to read data from an optical disk 100 such as a DVD, high-definition DVD, CD, or a Blu-ray disk. Information recorded on the surface of the optical disk 100 is detected by an optical reader 205 by reflecting a laser off of the disk surface. The optical reader 205 reads the information encoded on the surface of the optical disk 100 as it is rotated by a spindle motor 210, which is controlled by motor driver 215. Optical reader 205 converts the detected information into a signal, typically a signal at radio-frequencies, and thus produces an (RF) signal. To access data at various locations on the disk 100, the optical reader 205 moves radially between the inner and outer peripheries of the surface of the disk 100 under the control of a feeding motor 220.

The RF signal from the optical reader 205 is transmitted to an RF amplifier unit 225, which amplifies the RF signal and removes noise and distortion therefrom by means of a waveform equalization circuit, thereby outputting a shaped RF signal. The shaped RF signal from the RF amplifier unit 225 is then forwarded to a digital read channel and sampler 230, where it is read and forwarded to a memory device (e.g., DRAM 230) for subsequent use. In parallel, the RF signal is sent to an envelope detector 235, which, in the example of FIG. 2 is depicted as a module within the servo digital signal processor (DSP) 240. When the envelope detector 235 is presented with data from the BCA portion of the disk 100, it determines the sampling rate according to the disk rotation speed and transmits the sampling rate to the DRC and sampler module 230. The digitized BCA signal is then sent to a BCA code processor/decoder module 245 (which, in this embodiment, is shown as a component of microprocessor 250), where the identifying channel bits are extracted from the digitized BCA signal, phase encoded (PE) demodulation is performed on the data, and EDC or ECC checks of the data are done. Additionally, a decoding status indication is sent to microprocessor 250, which directs the overall operation of the disk drive 200 and, may, for example use the decoded BCA data to determine if the disk is an authorized copy by determining the presence of the BCA data and/or checking the data against a reference of known valid codes. In some embodiments, the identifying BCA code data is made available for use by the microprocessor 250 through storage in a volatile storage device, e.g., the dynamic random access memory (DRAM) component 255. In other embodiments, the BCA code data may be stored in non-volatile memory (e.g., Flash memory) such that the BCA data is maintained after the device is powered down, thus allowing the system to use the BCA data immediately upon a subsequent power-up cycle.

The RF amplifier unit 225 also sends signals for focus and optical reader tracking to the servo digital signal processor (DSP) 240 that provide instructions for controlling a focus servo and a tracking servo (not shown), based on a focus error signal and tracking error signal, respectively. The motor driver unit 215 generates the drive voltages required to move the optical reader 205, as well as to drive the tracking and focus servos, and applies the respective drive voltages to the optical reader 205 and feeding motor 220, so that positioning errors of the optical reader 205 can be continuously corrected.

Figure 3:
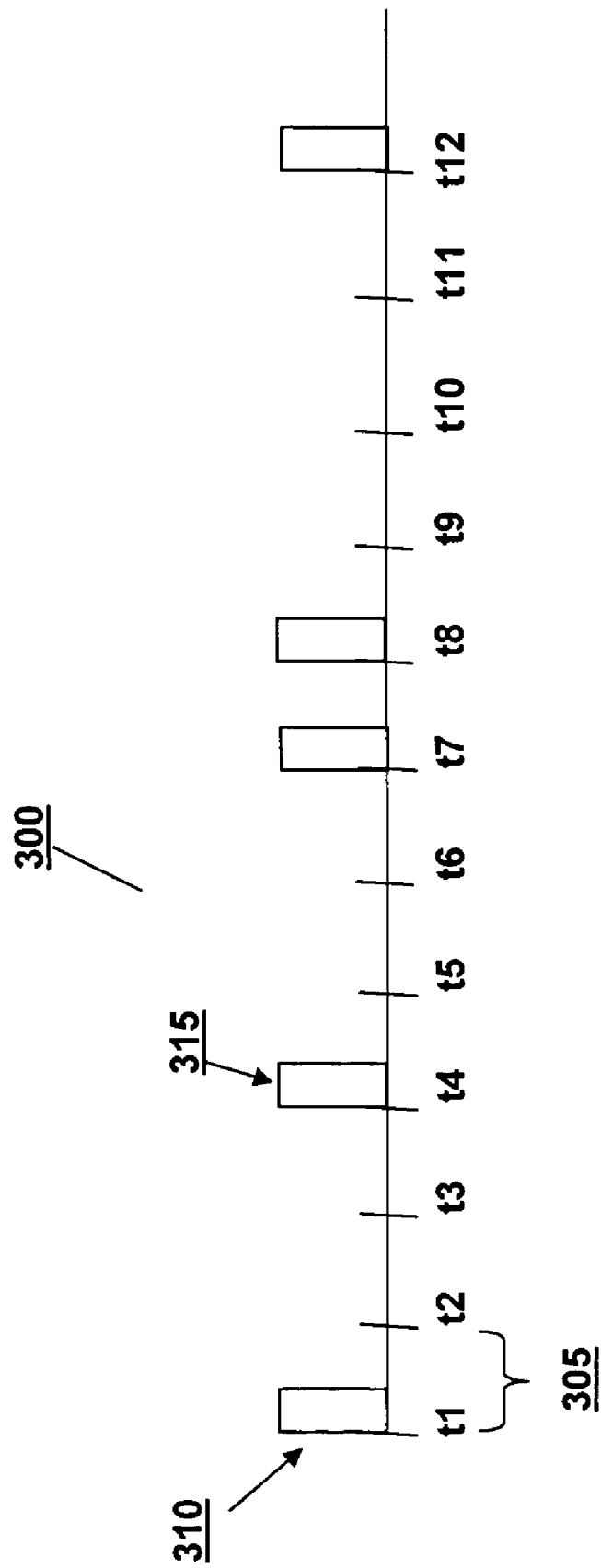
FIG. 3 schematically illustrates an example of a BCA signal.

Referring to FIG. 3, a digitized BCA signal is illustrated as a series 300 of channel bits, each representing a digital "1" or "0." The period T, illustrated as the period between markers $t_1$ and $t_2$, represents a time width of one channel bit. Typically, digital BCA data is represented using a "BCA return-to-zero" (BCA-RZ) format, in that channel bits representing a digital 1 have an initial value of 1 that "returns to 0" before the end of the period T in which that bit is located. For example, the BCA signals 310 and 315 (located at time $t_1$ and $t_4$ respectively) have leading edges with a value of 1 and return to 0 before the channel bit period ends at times $t_2$ and $t_5$. For channel bits representing a digital 0, the BCA signal remains at 0 for the entire duration of the period of that bit. Therefore, the signal train illustrated in FIG. 3 represents a BCA code of (1,0,0,1,0,0,1,1,0,0,0,1).

Conventional systems include a brushless spindle motor, the speed of which can be precisely controlled to assure that the disk is being rotated at an accurately defined and stable angular velocity. However, as noted earlier, the inclusion of such hardware adds significant costs to the end product (e.g., a commercially available DVD player) and perpetuates the need for the read/playback device to maintain a stable disk rotation speed. The present invention eliminates the need for such hardware and allows the BCA code data to be read while the disk speed is unstable. In addition to reducing production costs, the present invention shortens the "disk insertion to disk first read" time during which content protection and disk identification data is read and processed. The manner in which these advantages are achieved with now be described.

Figure 4:
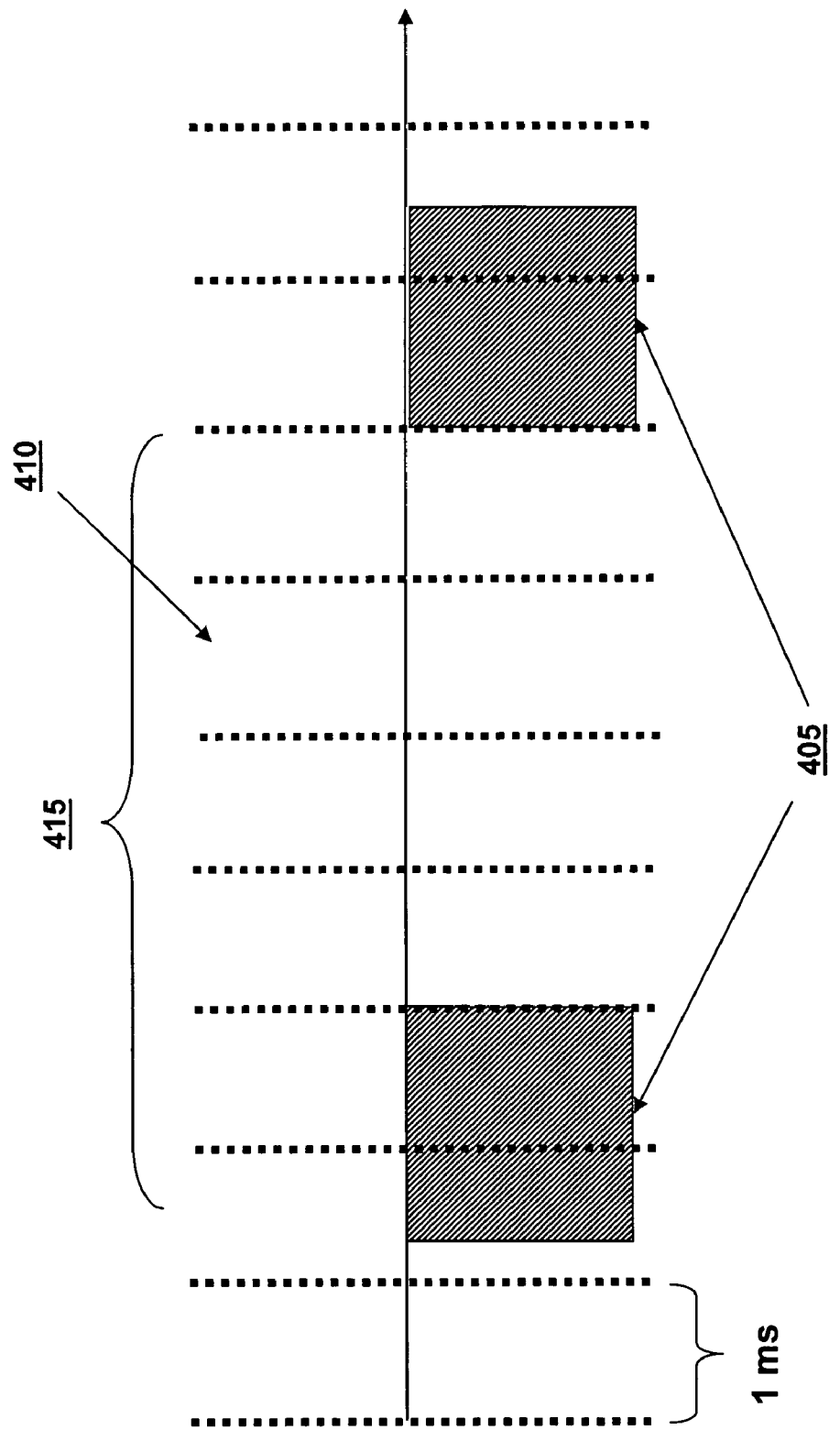
FIG. 4 schematically illustrates a representative radio frequency signal as generated by an optical pickup unit in the apparatus of FIG. 2 when reading BCA signal data encoded on the disk of FIG. 1.

FIG. 4 illustrates the RF signal generated by an optical reader when focused on the BCA (or the NBCA) of an optical disk. The shape of the signal 405 is defined by an encoded area, or "envelope," representing the BCA code data located on a portion of the disk's inner radius, and no signal when the optical reader is focused on the area of the inner radius where there is no data. At the granularity of FIG. 4 (each period representing 1 millisecond), each disk revolution produces a signal 405 representing the encoded area of the BCA and a single empty signal 410 representing the blank area of the BCA. By continuing to monitor the signal during a second revolution of the disk, the same encoded signal 405 is encountered. Thus, combining the signal 405 and signal 410, a signal 415 representing one complete revolution can be observed.

Figure 5:
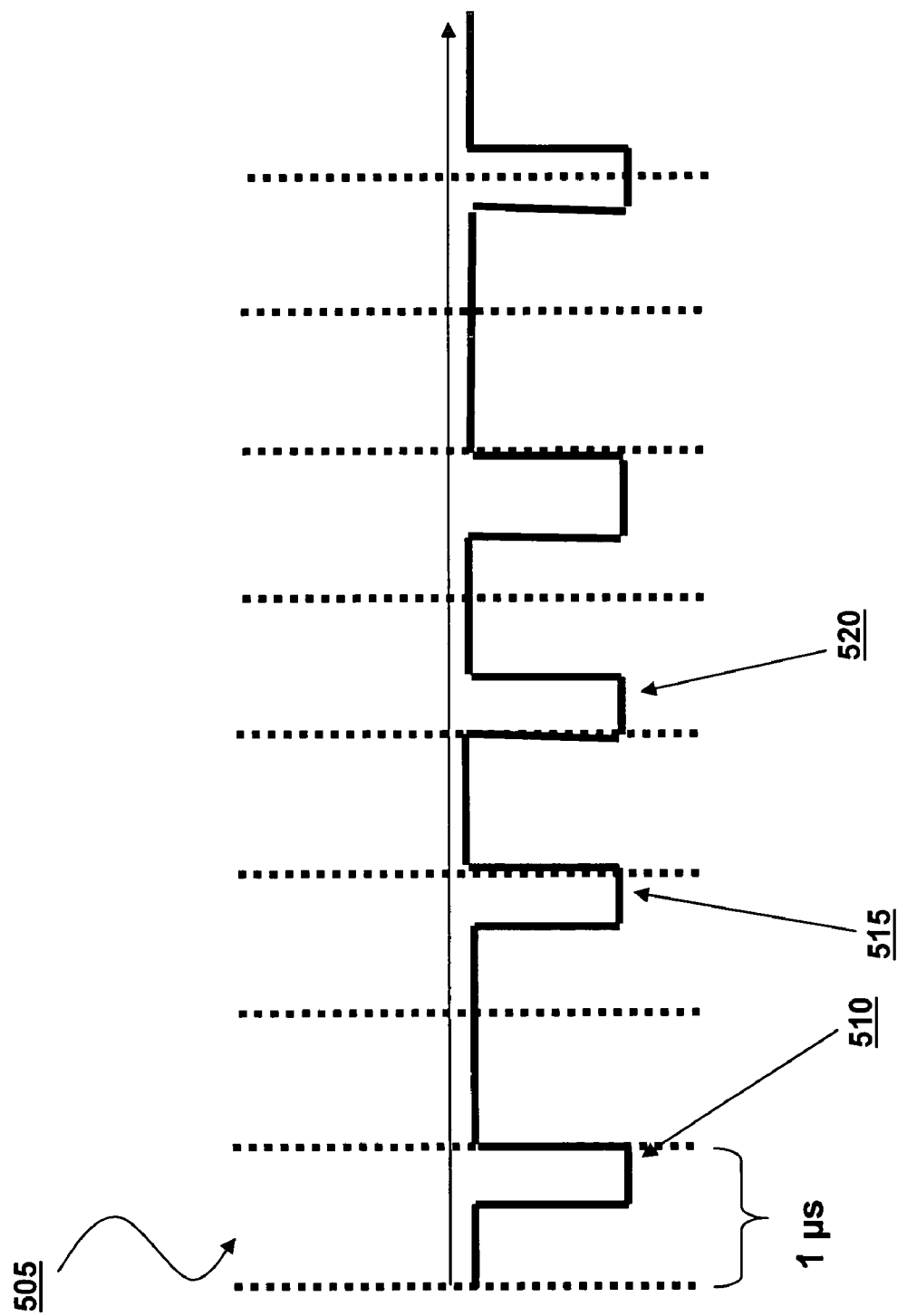
FIG. 5 schematically illustrates a more detailed representative radio frequency signal as generated by an optical pickup unit in the apparatus of FIG. 2 when reading BCA signal data encoded on the disk of FIG. 1.

Multiple low-reflectance stripes are cut into the disk during or after production to form the BCA code, and therefore when the code is read by an optical reader at an appropriate frequency, the individual stripes can be detected. FIG. 5 provides an expanded illustration of a signal 505 produced by an optical reader when focused on the BCA code data of an optical disk using a sampling frequency of 1 microsecond. Using such a frequency, signals 510, 515 and 520 representing the individual stripes that compose the BCA code data can be seen. In accordance with the present invention, the sampling of the BCA data envelope allows the calculation of the current disk speed, and thus the appropriate sampling rate may be determined. In addition, the sampling rate remains accurate as long as the angular velocity of the disk remains within about 15% from rotation to rotation without interfering with read accuracy.

Figure 6:
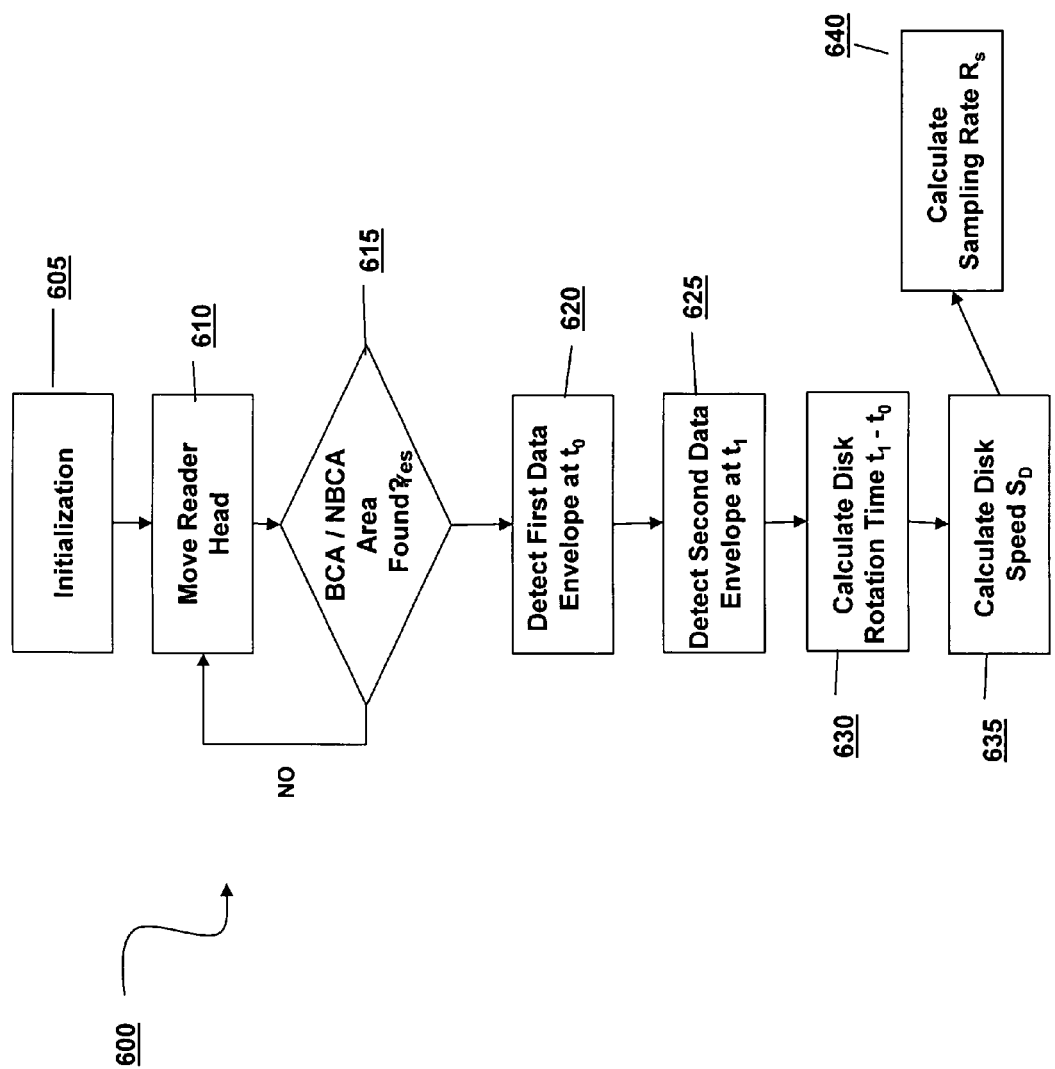
FIG. 6 is a flow diagram illustrating a process for determining a data sampling rate in accordance with one embodiment of the invention.

FIG. 6 illustrates a method 600 for determining a BCA code sampling rate in accordance with one embodiment of the invention. An initialization step 605 clears data from components (e.g., the BCA code processor 240, DRAM 250 and microprocessor 245 of FIG. 2) and instructs the various components that the BCA code processing unit (described in further detail below) is ready to begin the BCA code extraction and decoding process. At step 610, a command is sent to the feeding motor to move the optical reader to the inner radius of the disk. At decision step 615, a determination is made as to whether a command indicating BCA data envelope is being received by the envelope detector 235 (see FIG. 2). If no BCA envelope is being received, the process 600 reverts back to the positioning step 610. If the BCA envelope is received, a first edge of the BCA envelope is sampled and the time $t_0$ of the initial detection is recorded at step 620. As the disk rotates one full rotation, the optical reader once again becomes aligned with the BCA code, and a second instance of the data envelope is detected and the time $t_1$ of the second detection is set at step 625. The disk rotation time $T=t_1-t_0$ is then computed at step 630. From the disk rotation time T, a disk speed may be calculated and expressed in terms of a rotation frequency in step 635. As one non-limiting example, if T=0.0417 seconds (the time of one disk revolution), the disk rotation speed $S_D$ may be expressed as $S_D=1/T$, or 24 rotations per second (24 Hz).

Because the disk rotation speed of rotation i is known as the BCA code data is encountered during rotation i+1, the sampling rate for the second encounter of the BCA code can be determined at step 640. As the disk rotation speed is changing (during disk insertion, disk startup, or while the playback device is experiencing vibrations, for example) the sampling rate may be adjusted accordingly by using the disk rotation speed from the previous revolution. Thus, the BCA code data can be read during the second rotation of the disk without the need for hardware to maintain a constant angular velocity of the disk.

Knowing the sampling rate permits the accurate measurement of the length of each data element of, for example, a particular BCA pattern. For example, assume that the disc rotation speed is 24 Hz as described above, such that a data element of a BCA pattern occupies the focus of the optical reader for 3 microseconds and that ten samples are needed for the accurate extraction of the BCA data element. A sampling rate of 3.33 MHz can now be set (10 samples/3 μsec). If the rotation speed is 2× (48 Hz), the length of a BCA pattern zero stripe data element is 1.5 microseconds, and the sample frequency can therefore be set to 3.333*2=6.66 MHz to obtain the 10 data samples needed to accurately extract the BCA data element.

Such a data sampling procedure does not require a constant disc rotation speed, but rather a sampling of its value while the BCA code data is being read. This method and the apparatus in which the method is embodied measures the rotation speed using the BCA information envelope itself, and sets a proper sampling rate according to that measurement.

For embodiments in which the invention is provided as a software program, the program may be written in any one of a number of high level languages such as FORTRAN, PASCAL, JAVA, C, C++, $C^\#$, LISP, PERL, BASIC or any suitable programming language. Additionally, the software could be implemented in an assembly language and/or machine language directed to the microprocessor resident on a target device.

Figure 7:
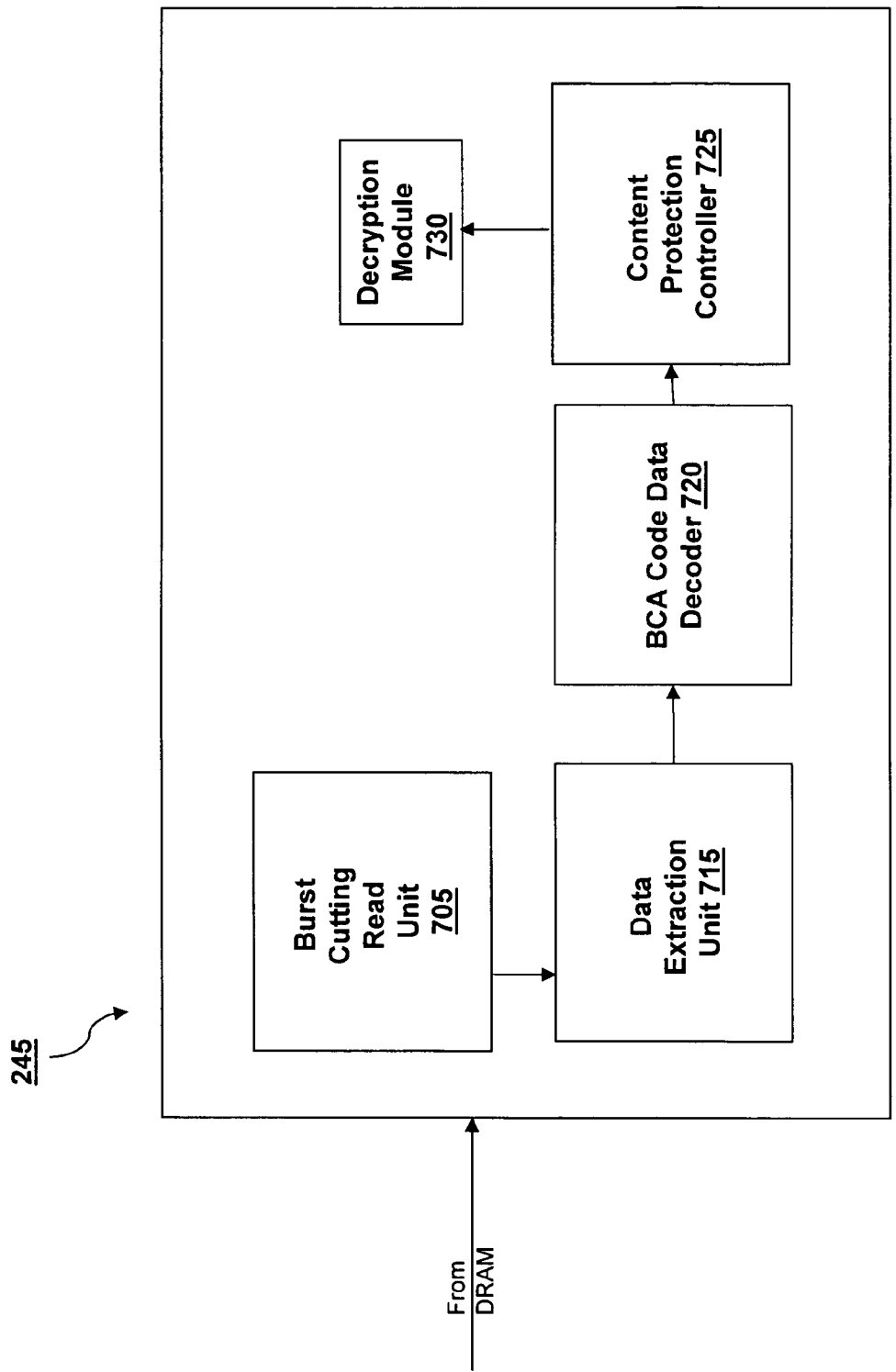
FIG. 7 is a block diagram illustrating an apparatus for determining a data sampling rate in accordance with one embodiment of the invention.

FIG. 7 illustrates one embodiment of the processor/decoder apparatus 245 for performing the methods described above. The BCA code processor/decoder 245 consists of a burst cutting read unit 705, a data extraction unit 715, BCA code data decoder 720 and a content protection controller 725. The read unit 705 receives the digitized BCA data from the DRAM 255. (The BCA code sampling rate is determined based on the disk speed measurement in the manner discussed above). The data extraction unit 715 receives the BCA data stream and extracts the BCA code channel bits from the digitized BCA data signal. The extracted channel bits are sent to the BCA Code data decoder in preparation for its use by the microprocessor. The results may then be used by the microprocessor to determine, for example, if the disk is authentic and the content on the disk should be read. The data can be searched, for example, for a serial number, authentication code, or counter mechanism for use by a protection controller 725 to control access to the content of the disk by limiting or preventing copying and/or playback. In some embodiments, the extracted data includes a decryption key which may be used by decryption module 730 to decrypt the content of the disk.

The apparatus 235 may be provided as one or more application specific integrated circuits (ASIC), programmable logic devices (PLD) field programmable gate arrays (FPGA), controlled by a program or programs in electrically erasable programmable read-only memories (EEPROM), programmable read-only memories (PROM), read-only memory devices (ROM), or dynamic random access memory (DRAM) which has been loaded with the appropriate instructions according to the embodiments described above. In some embodiments, the apparatus 235 may be implemented using one or more microprocessors such as the Pentium family or chips manufactured by Intel Corporation of Santa Clara, Calif. or the PowerPC family of chips manufactured by Motorola Corporation of Schaumburg, Ill. In other embodiments, the apparatus 235 may be implemented in the form of silicon modules as part of an integrated "System on a Chip" (SOC).

While the invention has been particularly shown and described with reference to specific preferred embodiments, it should be understood by those skilled in the art that various changes in form and detail can be made therein without departing from the spirit and scope of the invention as defined by the appended claims.

What is claimed is:

1. A method for determining a sampling rate for information on an optical disk, the method comprising:
   detecting first and second instances of a signal representing data encoded on an optical disk;
   determining a disk rotation speed based on the first and second signal instances of the signal; and
   determining sampling rate based on the determined disk rotation speed.

2. The method of claim 1 wherein the optical disk is a compact disk.

3. The method of claim 1 wherein the optical disk is a digital versatile disk.

4. The method of claim 3 wherein the digital versatile disk is a high-definition digital versatile disk.

5. The method of claim 1 wherein the optical disk is a blu-ray disk.

6. The method of claim 1 wherein the optical disk comprises attributes of both a high-definition digital versatile disk and a blu-ray disk.

7. The method of claim 1 wherein the data is encoded within at least one of a burst cutting area of the optical disk and a narrow burst cutting area of the optical disk.

8. The method of claim 7 wherein the data is encoded at least within the burst cutting area of the optical disk and the first and second instances of the signal result from reading a data envelope within the burst cutting area.

9. The method of claim 7 wherein the data is encoded at least within the narrow burst cutting area of the optical disk and the first and second instances of the signal result from optically reading a data envelope within the narrow burst cutting area.

10. The method of claim 7 wherein the disk rotation speed is determined by measuring a front-to-front time of an envelope associated with the data during one rotation of the optical disk.

11. The method of claim 1 wherein the first and second instances of the signal is detected while the optical disk is rotating at a non-uniform speed.

12. The method of claim 1 wherein the first and second instances of the signal are detected while the optical disk is rotating at a constant angular velocity.

13. The method of claim 1 wherein at least some of the data serves a content-protection function.

14. The method of claim 1 further comprising extracting information from the optical disk using the sampling rate.

15. The method of claim 14 further comprising searching the extracted information.

16. The method of claim 14 wherein the extracted information includes a decryption key.

17. A system for extracting information from an optical disk, the system comprising:
    a read element for detecting a data pattern from an optical disk; and
    a disk-speed measurement element, responsive to the read element, for measuring consecutive detections of a data signal therefrom and for determining a disk rotation speed and a sampling rate based on the measured consecutive detections of the data signal.

18. The system of claim 17 wherein the read element and the disk-speed measurement element are incorporated within an optical disk drive.

19. The system of claim 17 wherein the optical disk is a compact disk.

20. The system of claim 17 wherein the optical disk is a digital versatile disk.

21. The system of claim 20 wherein the digital versatile disk is a high-definition digital versatile disk.

22. The system of claim 17 wherein the optical disk is a blu-ray disk.

23. The system of claim 17 wherein the optical disk comprises attributes of both a high-definition digital versatile disk and a blu-ray disk.

24. The system of claim 17 wherein the data pattern is encoded within at least one of a burst cutting area of the optical disk and a narrow burst cutting area of the optical disk.

25. The system of claim 24 wherein the data is encoded within the burst cutting area of the optical disk and the consecutive instances of the data pattern result from reading a data envelope within the burst cutting area.

26. The system of claim 24 wherein the data is encoded within the narrow burst cutting area of the optical disk and the consecutive instances of the data pattern result from optically reading a data envelope within the narrow burst cutting area.

27. The system of claim 24 wherein the measurement element measures a front-to-front time of an envelope containing the data pattern, the disk rotation speed being determined during one rotation of the optical disk.

28. The system of claim 17 wherein the read element detects the data pattern from the optical disk while the optical disk is rotating at a non-uniform speed.

29. The system of claim 17 wherein the read element detects the data pattern from the optical disk while the optical disk is rotating at a constant angular velocity.

30. The system of claim 17 further comprising a data-extraction element for extracting information from the optimal disk using the determined sampling rate.

31. The system of claim 30 further comprising a content-protection element for managing access to data encoded on the optical disk in response to the information extracted by the data-extraction element.

32. The system of claim 30 further comprising a decryption module for using the extracted information to decrypt content on the disk.

33. A system for extracting information from an optical disk, the system comprising:
    means for detecting a data pattern from a cutting area of an optical disk; and
    means for measuring consecutive instances of a signal from the detection means, and for determining a disk rotation speed and a pattern sampling rate based on the measured consecutive instances of the signal.

* * * * *